(12) United States Patent
Wang et al.

(10) Patent No.: US 12,354,598 B2
(45) Date of Patent: Jul. 8, 2025

(54) RARE WORD RECOGNITION WITH LM-AWARE MWER TRAINING

(71) Applicant: Google LLC, Mountain View, CA (US)

(72) Inventors: Weiran Wang, Palo Alto, CA (US); Tongzhou Chen, Mountain View, CA (US); Tara N. Sainath, Jersey City, NJ (US); Ehsan Variani, Mountain View, CA (US); Rohit Prakash Prabhavalkar, Palo Alto, CA (US); Ronny Huang, Mountain View, CA (US); Bhuvana Ramabhadran, Mt. Kisco, NY (US); Neeraj Gaur, Mountain View, CA (US); Sepand Mavandadi, Mountain View, CA (US); Charles Caleb Peyser, New York, NY (US); Trevor Strohman, Mountain View, CA (US); Yangzhang He, Mountain View, CA (US); David Rybach, Munich (DE)

(73) Assignee: Google LLC, Mountain View, CA (US)

(*) Notice: Subject to any disclaimer, the term of this patent is extended or adjusted under 35 U.S.C. 154(b) by 302 days.

(21) Appl. No.: 18/187,222

(22) Filed: Mar. 21, 2023

(65) Prior Publication Data

US 2023/0298570 A1 Sep. 21, 2023

Related U.S. Application Data

(60) Provisional application No. 63/322,622, filed on Mar. 22, 2022, provisional application No. 63/269,707, filed on Mar. 21, 2022.

(51) Int. Cl.
*G10L 15/00* (2013.01)
*G10L 15/02* (2006.01)
(Continued)

(52) U.S. Cl.
CPC ............ *G10L 15/063* (2013.01); *G10L 15/02* (2013.01); *G10L 15/16* (2013.01); *G10L 15/19* (2013.01); *G10L 15/22* (2013.01)

(58) Field of Classification Search
CPC ............ G06F 16/685; H03M 2201/40; H03M 2201/60; G10L 15/16; G10L 19/005;
(Continued)

(56) References Cited

U.S. PATENT DOCUMENTS

2022/0005465 A1  1/2022  Prabhavalkar et al.

OTHER PUBLICATIONS

International Search Report and Written Opinion (EPO) for Application No. PCT/US2023/015751 dated May 30, 2023.
(Continued)

*Primary Examiner* — Vu B Hang
(74) *Attorney, Agent, or Firm* — Honigman LLP; Brett A. Krueger; Grant Griffith

(57) ABSTRACT

A method includes generating, using an audio encoder, a higher-order feature representation for each acoustic frame in a sequence of acoustic frames; generating, using a decoder, based on the higher-order feature representation, a plurality of speech recognition hypotheses, each hypotheses corresponding to a candidate transcription of an utterance and having an associated first likelihood score; generating, using an external language model, for each speech recognition hypothesis, a second likelihood score; determining, using a learnable fusion module, for each speech recognition hypothesis, a set of fusion weights based on the higher-order feature representation and the speech recognition hypothesis; and generating, using the learnable fusion module, for each speech recognition hypothesis, a third likelihood score based on the first likelihood score, the second likelihood score, and the set of fusion weights, the audio encoder and decoder trained using minimum additive error rate training in the presence of the external language model.

24 Claims, 5 Drawing Sheets

(51) Int. Cl.
*G10L 15/06* (2013.01)
*G10L 15/16* (2006.01)
*G10L 15/19* (2013.01)
*G10L 15/22* (2006.01)

(58) Field of Classification Search
CPC ......... G10L 19/00; G10L 25/27; G10L 25/30; G10L 15/02; G10L 15/063; G10L 15/12; G10L 15/07; G10L 15/20; G10L 15/22; G10L 15/26; G10L 15/30; G10L 15/08; G10L 15/10; G10L 15/14; G10L 15/1815; G10L 15/197; G10L 15/1822; G10L 15/183; G10L 15/193; G10L 15/19
See application file for complete search history.

(56) References Cited

OTHER PUBLICATIONS

Peyser Cal et al: "Improving Tail Performance of a Deliberation E2E ASR Model Using a Large Text Corpus", Interspeech 2020, Oct. 25, 2020 (Oct. 25, 2020), pp. 4921-4925, XP093046268, ISCA DOI: 10.21437/ Interspeech.2020-1465, Retrieved from the Internet: URL: http://www.interspeech2020.org/uploadfile/pdf/Thu-3-8-5.pdf.

RARE WORD RECOGNITION WITH LM-AWARE MWER TRAINING

CROSS REFERENCE TO RELATED APPLICATIONS

This U.S. patent application claims priority under 35 U.S.C. § 119(e) to U.S. Provisional Patent Application No. 63/322,622, filed on Mar. 22, 2022, and to U.S. Provisional Patent Application No. 63/269,708, filed on Mar. 21, 2022. The disclosures of these prior applications are considered part of the disclosure of this application and are hereby incorporated herein by reference in their entireties.

TECHNICAL FIELD

This disclosure relates to speech recognition models for improving rare word recognition.

BACKGROUND

Automatic speech recognition (ASR) is an important technology that is increasingly used in mobile devices and other devices. In general, ASR systems can provide accurate transcriptions of what a person has said with low latency (e.g., with only a short delay between the person speaking and a transcription appearing).

SUMMARY

One aspect of the disclosure provides a computer-implemented method for training a speech recognition model to improve rare word recognition with language model aware minimum word error rate training. The computer-implemented method when executed on data processing hardware causes the data processing hardware to perform operations including receiving, as input, a sequence of acoustic frames corresponding to an utterance, and generating, using an audio encoder, at each of a plurality of output steps, a higher-order feature representation for a corresponding acoustic frame in the sequence of acoustic frames. The operations further include generating, using a decoder, based on the higher-order feature representation at each of the plurality of output steps, a plurality of speech recognition hypotheses, each speech recognition hypotheses corresponding to a candidate transcription of the utterance and having an associated first likelihood score, and generating, using an external language model, for each speech recognition hypothesis of the plurality of speech recognition hypotheses, a second likelihood score associated with the speech recognition hypothesis. The operations also include determining, using a learnable fusion module, for each speech recognition hypothesis of the plurality of speech recognition hypotheses, a set of fusion weights based on the higher-order feature representation and the speech recognition hypothesis, and generating, using the learnable fusion module, for each speech recognition hypothesis of the plurality of speech recognition hypotheses, a third likelihood score based on the first likelihood score, the second likelihood score, and the set of fusion weights. Here, the audio encoder is trained using minimum additive error rate training in the presence of the external language model by adjusting likelihood scores according to minimum additive error rates among a top-k speech recognition hypotheses output from the decoder.

Implementations of the disclosure may include one or more of the following optional features. In some implementations, the operations also include selecting a speech recognition hypothesis of the plurality of speech recognition hypotheses as a speech recognition result for the sequence of acoustic frames based on the third likelihood scores for the plurality of speech recognition hypotheses. In some examples, the first likelihood score includes a conditional likelihood score and an internal language model likelihood score.

In some examples, the first likelihood score for a particular speech recognition hypothesis includes a first plurality of language model scores, each language model score of the first plurality of language model scores corresponding to a particular token of the particular speech recognition hypothesis; the second likelihood score for the particular speech recognition hypothesis includes a second plurality of language model scores, each language model score of the second plurality of language model scores corresponding to a particular token of the particular speech recognition hypothesis; the set of fusion weights for the particular speech recognition hypothesis includes a first plurality of fusion weights and a second plurality of fusion weights, each fusion weight of the first plurality of fusion weights corresponding to a particular token of the particular speech recognition hypothesis, and each fusion weight of the second plurality of fusion weights corresponding to a particular token of the particular speech recognition hypothesis. Here, generating, using the learnable fusion module, the third likelihood score for the particular speech recognition hypothesis may include: determining an internal language model score based on the first plurality of language model scores and the first plurality of fusion weights; determining an external language model score based on the second plurality of language model scores and the second plurality of fusion weights; and combining the internal language model score and the external language model score.

In some implementations, the audio encoder, the decoder, and the learnable fusion module are jointed trained. In some examples, the external language model is trained on text-only data. In some examples, the external language model includes a neural network language model including a stack of conformer layers or transformer layers. In other examples, the external language model includes a neural network language model including a stack of long short-term memory (LSTM) layers.

In some examples, the audio encoder includes a causal encoder including an initial stack of multi-head attention layers, and a non-causal encoder including a final stack of multi-head attention layers overlain on the initial stack of multi-head attention layers. In some implementations, the learnable fusion module is configured to compute per-token fusion weights for internal language model scores of the decoder and external language model scores of the external language model. In some implementations, a minimum additive error rate includes a minimum word error rate. In some examples, the external language model is trained on text-only data; and the audio encoder and the decoder are trained using hybrid autoregressive transducer (HAT) factorization to facilitate integration of the external language model trained on the text-only data.

Another aspect of the disclosure provides an automated speech recognition (ASR) system an audio encoder, a decoder, an external language model, and a learnable fusion module. The audio encoder is configured to receive, as input, a sequence of acoustic frames corresponding to an utterance, and generate, at each of a plurality of output steps, a higher-order feature representation for a corresponding acoustic frame in the sequence of acoustic frames. The decoder is configured to receive, as input, the higher-order feature representation generated by the audio encoder at each of the plurality of output step, and generate, based on the higher-order feature representation received at each of the plurality of output steps, a plurality of speech recognition hypotheses, each speech recognition hypotheses corresponding to a candidate transcription of the utterance and having an associated first likelihood score. The external language model is configured to receive, as input, the plurality of speech recognition hypotheses generated by the decoder, and generate, for each speech recognition hypothesis of the plurality of speech recognition hypotheses, a second likelihood score associated with the speech recognition hypothesis. The learnable fusion module is configured to, for each speech recognition hypothesis of the plurality of speech recognition hypotheses: receive, as input, the higher-order feature representation generated by the audio encoder at each of the plurality of output steps; determine a set of fusion weights based on the higher-order feature representation and the speech recognition hypothesis; and generate a third likelihood score based on the first likelihood score, the second likelihood score, and the set of fusion weights. Here, the audio encoder is trained using minimum additive error rate training in the presence of the external language model by adjusting likelihood scores according to minimum additive error rates among a top-k speech recognition hypotheses output from the decoder.

Implementations of the disclosure may include one or more of the following optional features. In some implementations, the operations also include selecting a speech recognition hypothesis of the plurality of speech recognition hypotheses as a speech recognition result for the sequence of acoustic frames based on the third likelihood scores for the plurality of speech recognition hypotheses. In some examples, the first likelihood score includes a conditional likelihood score and an internal language model likelihood score.

In some examples, the first likelihood score for a particular speech recognition hypothesis includes a first plurality of language model scores, each language model score of the first plurality of language model scores corresponding to a particular token of the particular speech recognition hypothesis; the second likelihood score for the particular speech recognition hypothesis includes a second plurality of language model scores, each language model score of the second plurality of language model scores corresponding to a particular token of the particular speech recognition hypothesis; the set of fusion weights for the particular speech recognition hypothesis includes a first plurality of fusion weights and a second plurality of fusion weights, each fusion weight of the first plurality of fusion weights corresponding to a particular token of the particular speech recognition hypothesis, and each fusion weight of the second plurality of fusion weights corresponding to a particular token of the particular speech recognition hypothesis. Here, generating, using the learnable fusion module, the third likelihood score for the particular speech recognition hypothesis may include: determining an internal language model score based on the first plurality of language model scores and the first plurality of fusion weights; determining an external language model score based on the second plurality of language model scores and the second plurality of fusion weights; and combining the internal language model score and the external language model score.

In some implementations, the audio encoder, the decoder, and the learnable fusion module are jointed trained. In some examples, the external language model is trained on text-only data. In some examples, the external language model includes a neural network language model including a stack of conformer layers or transformer layers. In other examples, the external language model includes a neural network language model including a stack of long short-term memory (LSTM) layers.

In some examples, the audio encoder includes a causal encoder including an initial stack of multi-head attention layers, and a non-causal encoder including a final stack of multi-head attention layers overlain on the initial stack of multi-head attention layers. In some implementations, the learnable fusion module is configured to compute per-token fusion weights for internal language model scores of the decoder and external language model scores of the external language model. In some implementations, a minimum additive error rate includes a minimum word error rate. In some examples, the external language model is trained on text-only data; and the audio encoder and the decoder are trained using hybrid autoregressive transducer (HAT) factorization to facilitate integration of the external language model trained on the text-only data.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Automatic speech recognition (ASR) is an important technology that is increasingly used in mobile devices and other devices. In general, ASR systems can provide accurate transcriptions of what a person has said with low latency (e.g., with only a short delay between the person speaking and a transcription appearing). However, conventional end-to-end (E2E) ASR models are trained on audio-text pairs, which represent only a small fraction of the available text-only data. Accordingly, conventional E2E ASR models may not accurately recognize rare words. In contrast, a language model (LM), which can be trained using text-only data, can more accurately recognize rare words. LMs have been combined with E2E ASR models to improve rare word recognition accuracy. For example, E2E ASR model scores and LM scores can be fused during inference using hybrid autoregressive transducer (HAT) factorization.

Implementations disclosed herein are directed toward incorporating LM scores into an E2E ASR loss term during training. However, incorporating LM scores into the training of ASR models may be difficult because E2E ASR models are traditionally trained against ground-truth labels, which is different from how LMs are incorporated during inference. Thus, implementations disclosed herein perform LM-aware minimum additive error rate training (e.g., LM-aware minimum word error rate (MWER)) by operating the E2E ASR model in beam search mode during training, which allows the E2E ASR model scores to be fused with LM scores during training similar to how E2E ASR model scores and LM scores are fused during inference. Here, E2E ASR model scores and LM scores may be fused using HAT factorization. However, conventional methods for determining and tuning fusion weights (e.g., parameter sweeping) are complex and computationally expensive. Moreover, after training, fusion weights are traditionally held fixed after training. In contrast, implementations disclosed herein configure and train a learnable fusion module (LFM) for determining per-token fusion weights for a speech recognition hypothesis in a data-dependent manner. In particular, the LFM determines the fusion weights for each token of a speech recognition hypothesis for an utterance based on higher-order feature representations (e.g., acoustic encodings) generated for acoustic frames of the utterance. That is, fusion weights are dynamically determined during inference. In disclosed implementations, the LFM is trained using LM-aware minimum additive error rate training (e.g., LM-aware MWER training).

Figure 1:
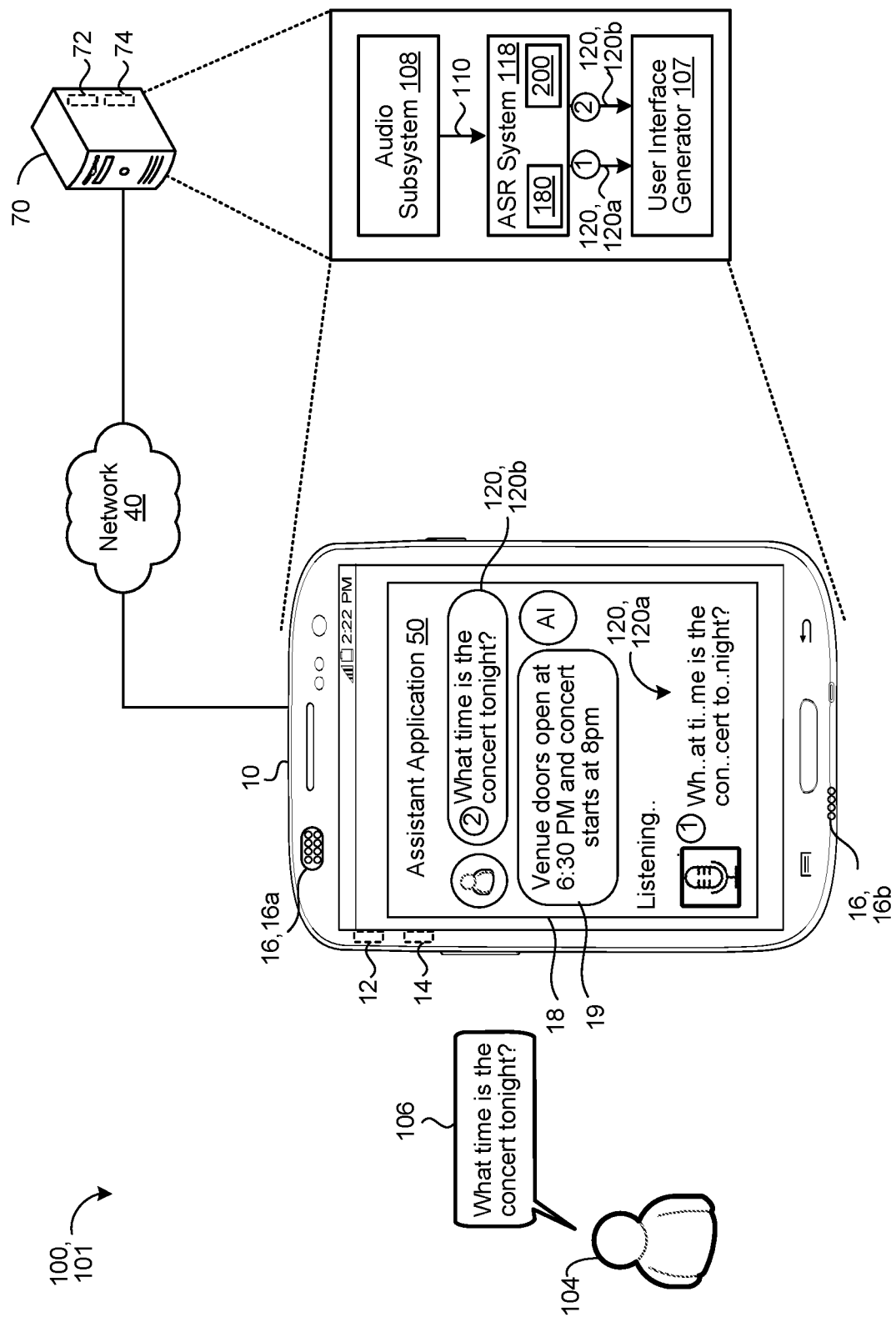
FIG. 1 is a schematic view of an example speech environment using an automatic speech recognition (ASR) system for transcribing speech.

FIG. 1 is a schematic view of an example of a speech environment 100 and system 101. In the speech environment 100, a user's 104 manner of interacting with a computing device, such as a user device 10, may be through voice input. The user device 10 (also referred to generally as a device 10) is configured to capture sounds (e.g., streaming audio data) from one or more users 104 within the speech environment 100. Here, the streaming audio data may refer to a spoken utterance 106 by the user 104 that functions as an audible query, a command for the device 10, or an audible communication captured by the device 10. Speech-enabled systems of the device 10 may field the query or the command by answering the query and/or causing the command to be performed/fulfilled by one or more downstream applications.

The user device 10 may correspond to any computing device associated with a user 104 and capable of receiving audio data. Some examples of user devices 10 include, but are not limited to, mobile devices (e.g., mobile phones, tablets, laptops, etc.), computers, wearable devices (e.g., smart watches), smart appliances, internet of things (IoT) devices, vehicle infotainment systems, smart displays, smart speakers, etc. The user device 10 includes data processing hardware 12 and memory hardware 14 in communication with the data processing hardware 12. The memory hardware 114 stores instructions, that when executed by the data processing hardware 12, cause the data processing hardware 12 to perform one or more operations. The user device 10 further includes an audio system 16 with an audio capture device (e.g., microphone) 16, 16a for capturing and converting spoken utterances 106 within the speech environment 100 into electrical signals and a speech output device (e.g., a speaker) 16, 16b for communicating an audible audio signal (e.g., as output audio data from the device 10). While the user device 10 implements a single audio capture device 16a in the example shown, the user device 10 may implement an array of audio capture devices 16a without departing from the scope of the present disclosure, whereby one or more capture devices 16a in the array may not physically reside on the user device 10, but be in communication with the audio system 16.

In the speech environment 100, an automated speech recognition (ASR) system 118 implementing an end-to-end (E2E) ASR model 200 and an external language model 230 resides on the user device 10 of the user 104 and/or on a remote computing device 70 (e.g., one or more remote servers of a distributed system executing in a cloud-computing environment) in communication with the user device 10 via a network 40. In some examples, the ASR model 200 includes a hybrid autoregressive transducer (HAT) model. The user device 10 and/or the remote computing device 70 also includes an audio subsystem 108 configured to receive the utterance 106 spoken by the user 104 and captured by the audio capture device 16a, and convert the utterance 106 into a corresponding digital format associated with input acoustic frames 110 capable of being processed by the ASR system 118. In the example shown, the user speaks a respective utterance 106 and the audio subsystem 108 converts the utterance 106 into corresponding audio data (e.g., acoustic frames) 110 for input to the ASR system 118. Thereafter, the ASR model 200 receives, as input, the acoustic frames 110 corresponding to the utterance 106, and generates/predicts, as output, a corresponding transcription 120 (e.g., recognition result/hypothesis) of the utterance 106. In the example shown, the ASR model 200 may perform streaming speech recognition to produce an initial speech recognition result 120, 120a and the external language model 230 may update (i.e., rescore) the initial speech recognition result 120a to produce a final speech recognition result 120, 120b. The server 70 includes data processing hardware 72, and memory hardware 74 in communication with the data processing hardware 72. The memory hardware 74 stores instructions that, when executed by the data processing hardware 72, cause the data processing hardware 72 to perform one or more operations, such as those disclosed herein.

The user device 10 and/or the remote computing device 70 also executes a user interface generator 107 configured to present a representation of the transcription 120 of the utterance 106 to the user 104 of the user device 10. As described in greater detail below, the user interface generator 107 may display the initial speech recognition results 120a in a streaming fashion during time 1 and subsequently display the final speech recognition result 120b during time 2. In some configurations, the transcription 120 output from the ASR system 118 is processed, e.g., by a natural language processing/understanding (NLP/NLU) module executing on the user device 10 or the remote computing device 70, to execute a user command/query specified by the utterance 106. Additionally or alternatively, a text-to-speech system (not shown) (e.g., executing on any combination of the user device 10 or the remote computing device 70) may convert the transcription into synthesized speech for audible output by the user device 10 and/or another device.

In the example shown, the user 104 interacts with a program or application 50 (e.g., a digital assistant application 50) of the user device 10 that uses the ASR system 118. For instance, FIG. 1 depicts the user 104 communicating with the digital assistant application 50 and the digital assistant application 50 displaying a digital assistant interface 18 on a screen of the user device 10 to depict a conversation between the user 104 and the digital assistant application 50. In this example, the user 104 asks the digital assistant application 50, "What time is the concert tonight?" This question from the user 104 is a spoken utterance 106 captured by the audio capture device 16a and processed by audio systems 16 of the user device 10. In this example, the audio system 16 receives the spoken utterance 106 and converts it into acoustic frames 110 for input to the ASR system 118.

Continuing with the example, the ASR model 200, while receiving the acoustic frames 110 corresponding to the utterance 106 as the user 104 speaks, encodes the acoustic frames 110 and then decodes the encoded acoustic frames 110 into the initial speech recognition results 120a. During time 1, the user interface generator 107 presents, via the digital assistant interface 18, a representation of the initial speech recognition results 120a of the utterance 106 to the user 104 of the user device 10 in a streaming fashion such that words, word pieces, and/or individual characters appear on the screen as soon as they are spoken. In some examples, the first look ahead audio context is equal to zero.

During time 2, the user interface generator 107 presents, via the digital assistant interface 18, a representation of the final speech recognition result 120b of the utterance 106 to the user 104 of the user device 10 rescored by the external language model 230. In some implementations, the user interface generator 107 replaces the representation of the initial speech recognition results 120a presented at time 1 with the representation of the final speech recognition result 120b presented at time 2. Here, time 1 and time 2 may include timestamps corresponding to when the user interface generator 107 presents the respective speech recognition result 120. In this example, the timestamp of time 1 indicates that the user interface generator 107 presents the initial speech recognition result 120a at an earlier time than the final speech recognition result 120b. For instance, because the final speech recognition result 120b is presumed to be more accurate than the initial speech recognition results 120a, the user interface generator 107 will ultimately display the final speech recognition result 120b as the transcription 120 to fix any terms that may have been misrecognized in the initial speech recognition results 120a. In this example, the streaming initial speech recognition results 120a output by the ASR model 200 are displayed on the screen of the user device 10 at time 1 are associated with low latency and provide responsiveness to the user 104 that his/her query is being processed, while the final speech recognition result 120b output by the external language model 230 and displayed on the screen at time 2 leverages an additional speech recognition model and/or a language model to improve the speech recognition quality in terms of accuracy, but at increased latency. However, because the initial speech recognition results 120a are displayed as the user speaks the utterance 106, the higher latency associated with producing, and ultimately displaying the final recognition result is not noticeable to the user 104.

In the example shown in FIG. 1, the digital assistant application 50 may respond to the question posed by the user 104 using NLP/NLU. NLP/NLU generally refers to a process of interpreting written language (e.g., the initial speech recognition results 120a and/or the final speech recognition result 120b) and determining whether the written language prompts any action. In this example, the digital assistant application 50 uses NLP/NLU to recognize that the question from the user 104 regards the user's schedule and more particularly a concert on the user's schedule. By recognizing these details with NLP/NLU, the automated assistant returns a response 19 to the user's query where the response 19 states, "Venue doors open at 7:30 PM and concert starts at 9 pm." In some configurations, NLP/NLU occurs on a remote server 70 in communication with the data processing hardware 12 of the user device 10.

Figure 2:
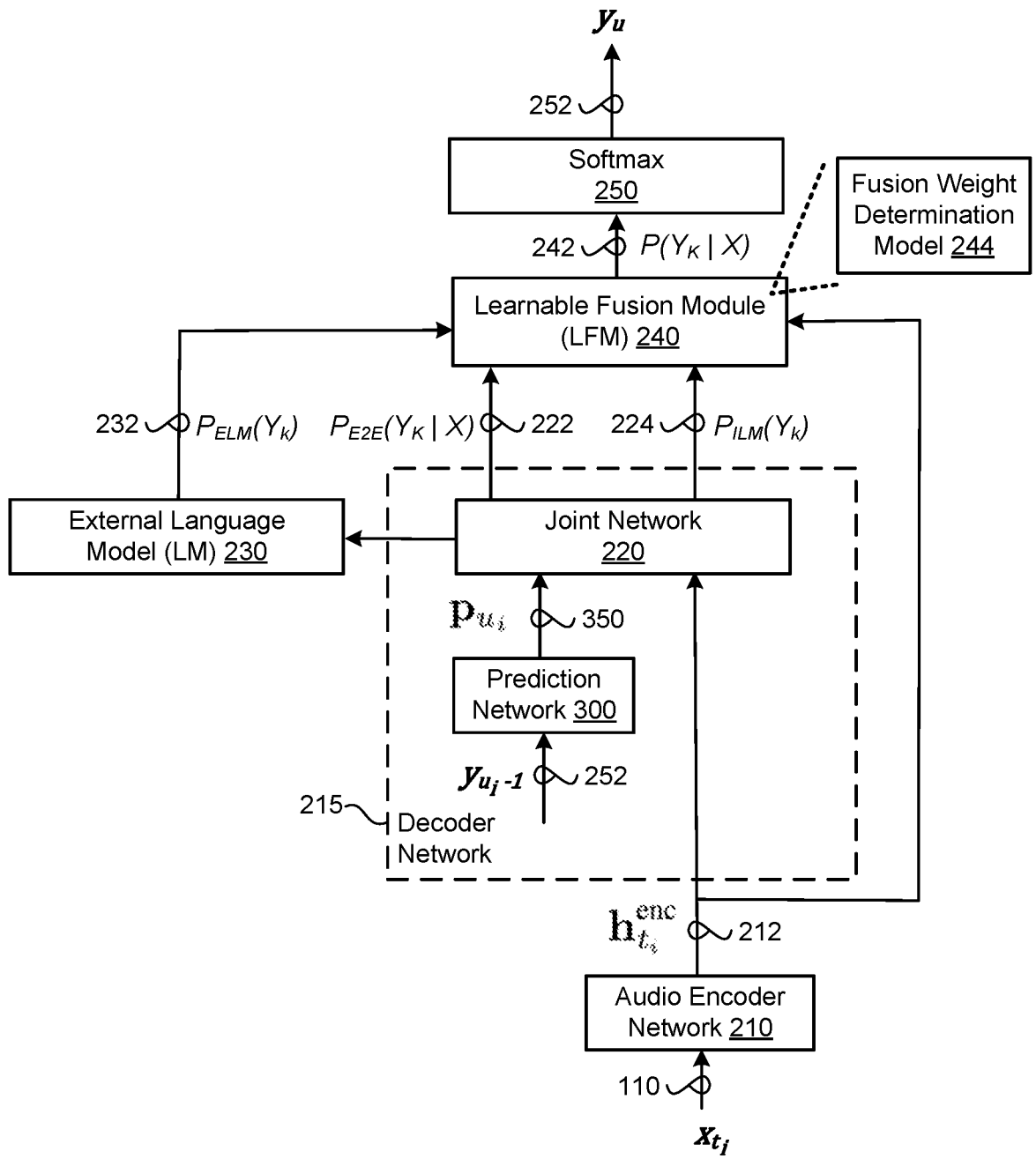
FIG. 2 is a schematic view of an example hybrid autoregressive transducer (HAT) model architecture of the ASR system of FIG. 1.

FIG. 2 is a schematic view of an example architecture for the ASR model 200 of FIG. 1. The example ASR model 200 may include a HAT model that is based on a variation of a recurrent neural network—transducer (RNN-T) model. The ASR model 200 provides a small computational footprint and utilizes less memory requirements than conventional ASR architectures, making the ASR model 200 suitable for performing speech recognition entirely on the user device 10 (e.g., no communication with a remote server is required).

As shown, the ASR model 200 integrates with the external language model (LM) 230 and includes an audio encoder network 210, a prediction network 300, a joint network 220, and a final softmax layer 250. The prediction network 300 and the joint network 220 may collectively provide a decoder 215. In some examples, the external LM 230 is trained separately from the audio encoder network 210 and the decoder 215. The audio encoder network 210, which is roughly analogous to an acoustic model (AM) in a traditional ASR system, and may include a recurrent network of stacked Long Short-Term Memory (LSTM) layers or a stack of multi-head attention layers. For instance, the audio encoder network 210 reads a sequence of d-dimensional feature vectors (e.g., acoustic frames 110) $X = x_1, x_2, \ldots, x_T$), where $x_t \in \mathbb{R}^d$, and produces at each time step a higher-order feature representation 212. This higher-order feature representation 212 is denoted as $h_1^{enc}, \ldots, h_T^{enc}$. In some examples, the audio encoder network 210 includes a multi-head attention encoder with twelve layers and an attention dimension of 512. For instance, the encoder network 210 may include a stack of multi-head attention layers such as conformer layers or transformer layers. Another example audio encoder network 210 includes a causal encoder having an initial stack of conformer layers (or other type of multi-head attention layers), and a non-causal encoder having a final stack of conformer layers (or other type of multi-head attention layers) overlain on the initial stack of conformer layers.

The prediction network 300 may be an LSTM network, which, like an LM, processes the sequence of non-blank symbols 252 output by the final softmax layer 250 so far, $y_0, \ldots, y_{ui-1}$, into a dense or hidden representation $p_{u_i}$ 350. Described in greater detail below in connection with FIG. 3, the representation $p_{u_i}$ 350 includes a single embedding vector. Notably, the sequence of non-blank symbols 252 received at the prediction network 300 capture linguistic dependencies between non-blank symbols 252 predicted during the previous time steps so far to assist the joint network 220 in predicting the probability of a next output symbol or blank symbol during the current time step. As described in greater detail below, to contribute to techniques for reducing the size of the prediction network 300 without sacrificing accuracy/performance of the ASR model 200, the prediction network 300 may receive a limited-history sequence of non-blank symbols 252 $y_{ui-n}, \ldots, y_{ui-1}$ that is limited to the N previous non-blank symbols 252 output by the final softmax layer 250. In some examples, the prediction network 300 computes LM likelihood scores based on two previous non-blank tokens 252. The prediction network 300 may have two 2,048-dimensional LSTM layers, each of which is followed by a 740-dimensional projection layer as well as an embedding layer of 128 units.

The joint network 220 combines the higher-order feature representation $h_{t_i}^{enc}$ 212 produced by the audio encoder network 210 and the representation $p_{u_i}$ 350 (i.e., single embedding vector 350) produced by the prediction network 300. The joint network 220 predicts a conditional distribution $P_{E2E}(y_i|x_{t_i}, y_0, \ldots, y_{u_{i-1}})$ 222 over the next output symbol conditioned on the acoustic frames $x_{t_i}$ 110. Stated differently, the joint network 220 generates, at each time step, the probability distribution 222 of conditional likelihood scores over possible speech recognition hypotheses. Here, the "possible speech recognition hypotheses" correspond to a set of output labels each representing a symbol/character in a specified natural language. For example, when the natural language is English, the set of output labels may include twenty-seven (27) symbols, e.g., one label for each of the 26-letters in the English alphabet and one label designating a space. Accordingly, the joint network 220 may output a set of values indicative of the likelihood of occurrence of each of a predetermined set of output labels. This set of values can be a vector and can indicate a probability distribution over the set of output labels. In some cases, the output labels are graphemes (e.g., individual characters, and potentially punctuation and other symbols), but the set of output labels is not so limited. For example, the set of output labels can include wordpieces and/or entire words, in addition to or instead of graphemes. The output distribution of the joint network 220 can include a posterior probability value for each of the different output labels. Thus, if there are 100 different output labels representing different graphemes or other symbols, the output $P_{E2E}(y_i|x_{t_i}, y_0, \ldots, y_{u_{i-1}})$ 222 of the joint network 220 can include 100 different probability values, one for each output label. The probability distribution can then be used to select and assign scores to candidate orthographic elements (e.g., graphemes, wordpieces, and/or words) in a beam search process (e.g., by the softmax layer 250) for determining the transcription 120.

The joint network 220 also predicts, for each of the top K speech recognition hypotheses $\{Y_1, \ldots, Y_K\}$ produced by a beam search performed by the joint network 220, a likelihood score $P_{ILM}(Y_k)$ 224. Here, the joint network 200 predicts the likelihood score $P_{ILM}(Y_k)$ 224 using no or null higher-order feature representations $h_{t_i}^{enc}$ 212. Thus, the likelihood scores $P_{ILM}(Y_k)$ 224 represent internal LM scores for the decoder 215 that are based on the limited set of audio-text training data used to train the audio encoder network 210 and the decoder network 215 and, thus, may be biased. In some implementations, the joint network 220 has 740 hidden units, and performs a beam search using a beam size of eight.

The external LM 230 predicts, for each of the top K speech recognition hypotheses $\{Y_1, \ldots, Y_K\}$ produced by the beam search performed by the joint network 220, a likelihood score $P_{ELM}(Y_k)$ 232. Here, the external LM 320 is trained based on a large corpus of text-only data, and is trained separate from the audio encoder network 210 and the decoder network 215. Because the external LM 230 is trained on a large corpus of text-only data it can correct for biases in the internal LM likelihood scores $P_{ILM}(Y_k)$ 224. An example external LM 230 includes a neural network LM having a stack of LSTM layers (e.g., four layers) of 2048 units. Another example external LM 230 includes a neural network LM having a conformer with twelve layers and an attention dimension of 384. In yet another example, the external LM 230 includes a neural network LM having a stack of transformer layers.

Implementations herein incorporate a learnable fusion module (LFM) LFM 240 that performs HAT factorization for fusing or combining a first likelihood score determined by the joint network (i.e., including the likelihood scores 224 and 224) and the second likelihood score 232 determined by the external LM 230 to determine for each of the top K speech recognition hypotheses $\{Y_1, \ldots, Y_K\}$ produced by the beam search performed by the joint network 220, a third likelihood score $P(Y_k|X)$ 242 for each hypothesis $\{Y_1, \ldots, Y_K\}$. The likelihood score $P(Y_k|X)$ 242 may be expressed as:

$$\log P(Y_k|X) := \log P_{E2E}(Y_k|X) - \lambda \cdot \log P_{ILM}(Y_k) + \gamma \cdot \log P_{ELM}(Y_k) + C \quad (1)$$

where $\lambda$ and $\gamma$ are vectors of fusion weights used to fuse the internal LM scores $P_{ILM}(Y_k)$ 224 and the external LM scores and $P_{ELM}(Y_k)$ 232, and C is a normalizing constant that may be chosen such that $\Sigma_{k=1}^{k} P(Y_k|X) = 1$. Letting $\lambda = [\lambda_1, \ldots, \lambda_L]$ and $\log P_{ILM}(Y_k) = [s_1, \ldots, s_L]$, where L is the number of symbols or tokens in the speech recognition hypothesis $Y_k$, the total contribution score for the internal LM may be expressed as $$\lambda \cdot \log P_{ILM}(Y_k) = \Sigma_{l=1}^{L} \lambda_l s_l \quad (2)$$

Similarly, letting $\gamma = [\gamma_1, \ldots, \gamma_L]$ and $\log P_{ELM}(Y_k) = [p_1, \ldots, p_L]$, the total contribution score for the external LM 230 may be expressed as $$\gamma \cdot \log P_{ELM}(Y_k) = \Sigma_{l=1}^{L} \gamma_l p_l \quad (3)$$

Each fusion weight of the first plurality of fusion weights $\mu = [\mu_1, \ldots, \mu_L]$ corresponds to a particular token of the hypothesis $Y_k$. Similarly, each fusion weight of the second plurality of fusion weights $\lambda = [\lambda_1, \ldots, \lambda_L]$ corresponds to a particular token of the hypothesis $Y_k$. In other words, the pluralities of fusion weights $\mu = [\mu_1, \ldots, \mu_L]$ and $\lambda = [\lambda_1, \ldots, \lambda_L]$ are per-token fusion weights. This is in stark contrast to conventional HAT factorization where the same scalar fusion weight is applied to all tokens of a hypothesis $Y_k$. Similarly, each likelihood score of the pluralities of likelihood scores $P_{ILM}(Y_k)$ 224 and $P_{ELM}(Y_k)$ 232 corresponds to a particular token of the hypothesis $Y_k$.

The audio encoder network 210 and the decoder network 215 may be trained using an additive error rate-based loss, such as an MWER-based loss, to incorporate the previously and separately trained external LM 230. An example MWER-based loss that may be used for training the audio encoder network 210 and the decoder network 215 is expressed as $$\ell_{MWER}(X, Y^*, \{Y_k\}_{k=1}^{K}) := \Sigma_{k=1}^{K} \log P(Y_k|X) \cdot \text{NWE}(Y_k, Y^*) \quad (4)$$

where $\text{NWE}(Y_k, Y^*)$ represents the number of word errors between $Y_k$ and $Y^*$. In some implementations, a composite loss of $$\ell_{MWER}(X, Y^*, \{Y_k\}_{k=1}^{K}) - \theta \cdot \log P_{E2E}(Y^*|X) \quad (5)$$

is minimized during training to improve learning stability. An example value of $\theta$ is 0.04. An example MWER loss for training is computed using the top eight hypotheses $Y_k$.

The LFM 240 includes a fusion weight determination model 244 configured and trained for determining, for each speech recognition hypothesis $Y_k$, the fusion weight vector $\mu = [\mu_1, \ldots, \mu_L]$ for the internal LM scores 224 of the decoder 215, and fusion weight vector $\gamma = [\gamma_1, \ldots, \gamma_L]$ for the external LM scores 232 of the external LM 230 based on the higher-order feature representations 212 and features of the hypothesis $Y_k$. Notably, here the fusion weight vectors $\mu = [\mu_1, \ldots, \mu_L]$ and $\gamma = [\gamma_1, \ldots, \gamma_L]$ are dynamically determined during inference based on data (i.e., based on the higher-order feature representations 212 and the hypothesis $Y_k$). That is, the fusion weight vectors $\mu = [\mu_1, \ldots, \mu_L]$ and $\gamma = [\gamma_1, \ldots, \gamma_L]$ are not determined during training and then held fixed during inference. In some examples, the fusion weight determination model 244 includes a transformer architecture similar to an attention-based decoder, and determines the fusion weight vectors $\mu=[\mu_1, \ldots, \mu_L]$ and $\gamma=[\gamma_1, \ldots, \gamma_L]$ for a hypothesis $Y_k$ by performing causal self-attention to features of the hypothesis $Y_k$ and cross-attention to the higher-order feature representations 212. An example fusion weight determination model 244 includes three transformer layers and an attention dimension of 256 or 320. In some examples, the fusion weight determination model 244 is trained on a speech recognition task based the MWER-based loss of Equation (4) and/or Equation (5) after the audio encoder network 210 and the decoder network 215 are trained and while coefficients of the audio encoder network 210 and the decoder network 215 are held fixed. In other examples, the audio encoder network 210, the decoder network 215, and the fusion weight determination model 244 are jointed trained on a speech recognition task based the MWER-based loss of Equation (4) and/or Equation (5).

The final softmax layer 250 receives the likelihood scores $P(Y_k|X)$ 242 and selects the speech recognition hypothesis $Y_k$ with the highest likelihood score $P(Y_k|X)$ 242 to produce the transcription 120. The ASR model 200 does not make a conditional independence assumption, rather the prediction of each symbol $y_u$ 252 is conditioned not only on the acoustic frames 110 but also on the sequence of labels 252 $y_{ui-n}, \ldots, y_{ui-1}$ output so far. The ASR model 200 does assume an output symbol 252 is independent of future acoustic frames 110, which allows the ASR model 200 to be employed in a streaming fashion.

Figure 3:
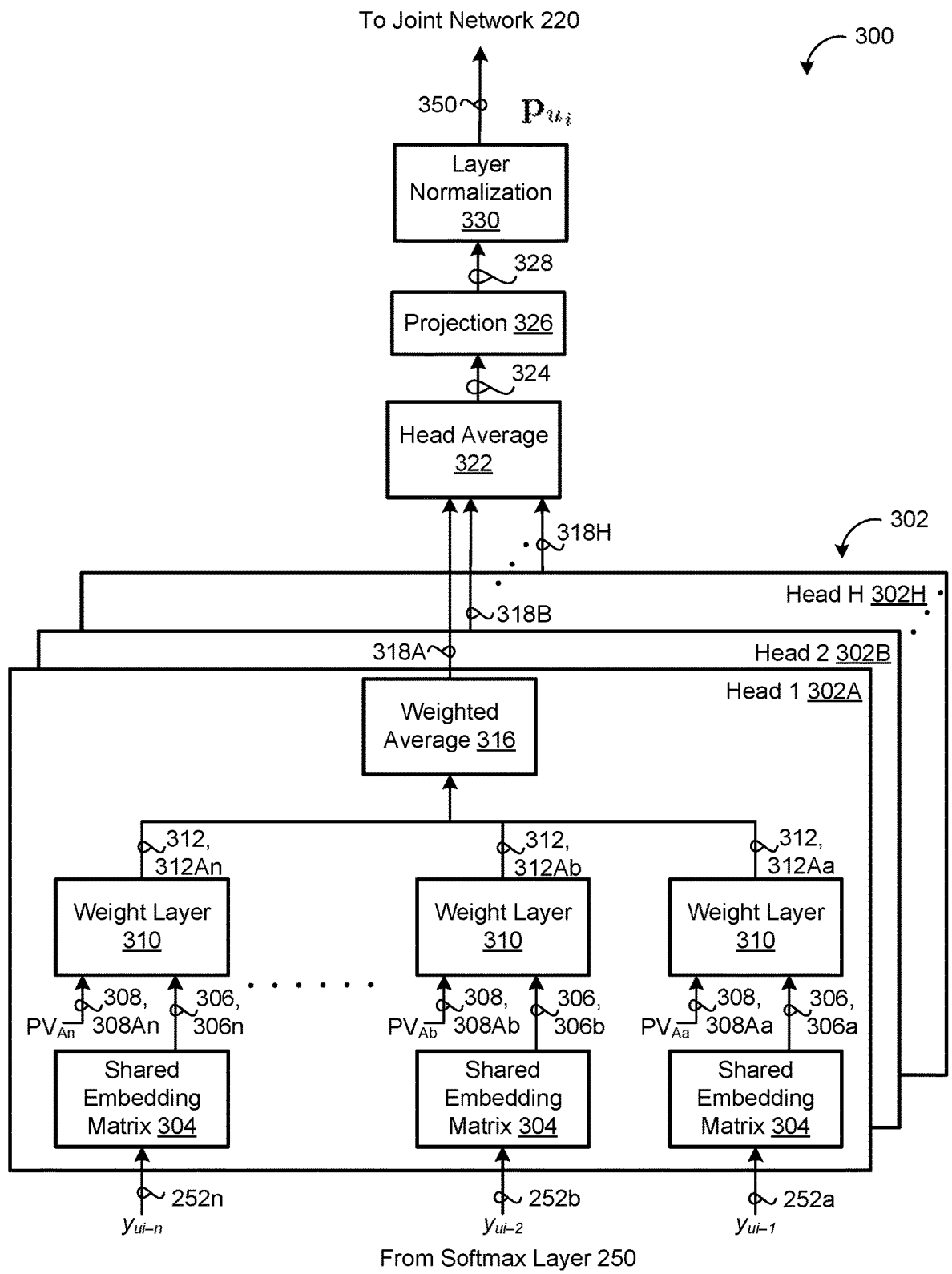
FIG. 3 is a schematic view of an example tied and reduced prediction network.

FIG. 3 is a schematic view of an example prediction network 300 for the ASR model 200. The prediction network 300 receives, as input, a sequence of non-blank symbols 252a-n $y_{ui-n}, \ldots, y_{ui-1}$ that is limited to the N previous non-blank symbols 252a—n output by the final softmax layer 250. In some examples, N is equal to two. In other examples, N is equal to five, however, the disclosure is non-limiting and N may equal any integer. The sequence of non-blank symbols 252a-n indicates an initial speech recognition result 120a (FIG. 1). In some implementations, the prediction network 300 includes a multi-headed attention mechanism 302 that shares a shared embedding matrix 304 across each head 302A-302H of the multi-headed attention mechanism. In one example, the multi-headed attention mechanism 302 includes four heads. However, any number of heads may be employed by the multi-headed attention mechanism 302. Notably, the multi-headed attention mechanism improves performance significantly with minimal increase to model size. As described in greater detail below, each head 302A-H includes its own row of position vectors 308, and rather than incurring an increase in model size by concatenating outputs 318A-H from all the heads, the outputs 318A-H are instead averaged by a head average module 322.

Referring to the first head 302A of the multi-headed attention mechanism 302, the head 302A generates, using the shared embedding matrix 304, a corresponding embedding 306, 306a—n (e.g., $X \in \mathbb{R}^{N \times d_e}$) for each non-blank symbol among the sequence of non-blank symbols 252a—n $y_{ui-n}, \ldots, y_{ui-1}$ received as input at the corresponding time step from the plurality of time steps. Notably, since the shared embedding matrix 304 is shared across all heads of the multi-headed attention mechanism 302, the other heads 302B-H all generate the same corresponding embeddings 306 for each non-blank symbol. The head 302A also assigns a respective position vector $PV_{Aa-An}$ 308, 308Aa-An (e.g., $P \in \mathbb{R}^{H \times N \times d_e}$) to each corresponding non-blank symbol in the sequence of non-blank symbols 252a-n $y_{ui-n}, \ldots, y_{ui-1}$. The respective position vector PV 308 assigned to each non-blank symbol indicates a position in the history of the sequence of non-blank symbols (e.g., the N previous non-blank symbols 252a—n output by the final softmax layer 250). For instance, the first position vector $PV_{Aa}$ is assigned to a most recent position in the history, while the last position vector $PV_{An}$ is assigned to a last position in the history of the N previous non-blank symbols output by the final softmax layer 250. Notably, each of the embeddings 306 may include a same dimensionality (i.e., dimension size) as each of the position vectors PV 308.

While the corresponding embedding generated by shared embedding matrix 304 for each for each non-blank symbol among the sequence of non-blank symbols 252a-n $y_{ui-n}, \ldots, y_{ui-1}$, is the same at all of the heads 302A-H of the multi-headed attention mechanism 302, each head 302A-H defines a different set/row of position vectors 308. For instance, the first head 302A defines the row of position vectors $PV_{Aa-An}$ 308Aa-An, the second head 302B defines a different row of position vectors $PV_{Ba-Bn}$ 308$_{Ba-Bn}$, ..., and the $H^{th}$ head 302 H defines another different row of position vectors $PV_{Ha-Hn}$ 308$_{Ha-Hn}$.

For each non-blank symbol in the sequence of non-blank symbols 252a-n received, the first head 302A also weights, via a weight layer 310, the corresponding embedding 306 proportional to a similarity between the corresponding embedding and the respective position vector PV 308 assigned thereto. In some examples, the similarity may include a cosine similarity (e.g., cosine distance). In the example shown, the weight layer 310 outputs a sequence of weighted embeddings 312, 312Aa-An each associated with the corresponding embedding 306 weighted proportional to the respective position vector PV 308 assigned thereto. Stated differently, the weighted embeddings 312 output by the weight layer 310 for each embedding 306 may correspond to a dot product between the embedding 306 and the respective position vector PV 308. The weighted embeddings 312 may be interpreted as attending over the embeddings in proportion to how similar they are to the positioned associated with their respective position vectors PV 308. To increase computational speed, the prediction network 300 includes non-recurrent layers, and therefore, the sequence of weighted embeddings 312Aa-An are not concatenated, but instead, averaged by a weighted average module 316 to generate, as output from the first head 302A, a weighted average 318A of the weighted embeddings 312Aa-An represented by:

$$\text{Prediction}(X, P) = \frac{1}{H*N} \sum_{h,n} X_n * \sum_e (X_{n,e} * P_{h,n,e}) \quad (6)$$

In Equation (1), h represents the index of the heads 302, n represents position in context, and e represents the embedding dimension. Additionally, in Equation (6), H, N, and $d_e$ include the sizes of the corresponding dimensions. The position vector PV 308 does not have to be trainable and may include random values. Notably, even though the weighted embeddings 312 are averaged, the position vectors PV 308 can potentially save position history information, alleviating the need to provide recurrent connections at each layer of the prediction network 300.

The operations described above with respect to the first head 302A are similarly performed by each other head 302B-H of the multi-headed attention mechanism 302. Due to the different set of positioned vectors PV 308 defined by each head 302, the weight layer 310 outputs a sequence of weighted embeddings 312Ba-Bn, 312Ha-Hn at each other head 302B-H that is different than the sequence of weighted embeddings 312Aa-Aa at the first head 302A. Thereafter, the weighted average module 316 generates, as output from each other corresponding head 302B-H, a respective weighted average 318B-H of the corresponding weighted embeddings 312 of the sequence of non-blank symbols.

In the example shown, the prediction network 300 includes a head average module 322 that averages the weighted averages 318A-H output from the corresponding heads 302A-H. A projection layer 326 with SWISH may receive, as input, an output 324 from the head average module 322 that corresponds to the average of the weighted averages 318A-H, and generate, as output, a projected output 328. A final layer normalization 330 may normalize the projected output 328 to provide the single embedding vector $p_{u_i}$ 350 at the corresponding time step from the plurality of time steps. The prediction network 300 generates only a single embedding vector $p_{u_i}$ 350 at each of the plurality of time steps subsequent to an initial time step.

In some configurations, the prediction network 300 does not implement the multi-headed attention mechanism 302 and only performs the operations described above with respect to the first head 302A. In these configurations, the weighted average 318A of the weighted embeddings 312Aa-An is simply passed through the projection layer 326 and layer normalization 330 to provide the single embedding vector $p_{u_i}$ 350.

In some implementations, to further reduce the size of the RNN-T decoder, i.e., the prediction network 300 and the joint network 220, parameter tying between the prediction network 300 and the joint network 220 is applied. Specifically, for a vocabulary size V and an embedding dimension $d_e$, the shared embedding matrix 304 at the prediction network is $E \in \mathbb{R}^{|V| \times d_e}$. Meanwhile, a last hidden layer includes a dimension size $d_h$ at the joint network 220, feed-forward projection weights from the hidden layer to the output logits will be $W \in \mathbb{R}^{d_h \times |V+1|}$, with an extra blank token in the vocabulary. Accordingly, the feed-forward layer corresponding to the last layer of the joint network 220 includes a weight matrix $[d_h, |V|]$. By having the prediction network 300 to tie the size of the embedding dimension $d_e$ to the dimensionality $d_h$ of the last hidden layer of the joint network 220, the feed-forward projection weights of the joint network 220 and the shared embedding matrix 304 of the prediction network 300 can share their weights for all non-blank symbols via a simple transpose transformation. Since the two matrices share all their values, the RNN-T decoder only needs to store the values once on memory, instead of storing two individual matrices. By setting the size of the embedding dimension $d_e$ equal to the size of the hidden layer dimension $d_h$, the RNN-T decoder reduces a number of parameters equal to the product of the embedding dimension $d_e$ and the vocabulary size |V|. This weight tying corresponds to a regularization technique.

Figure 4:
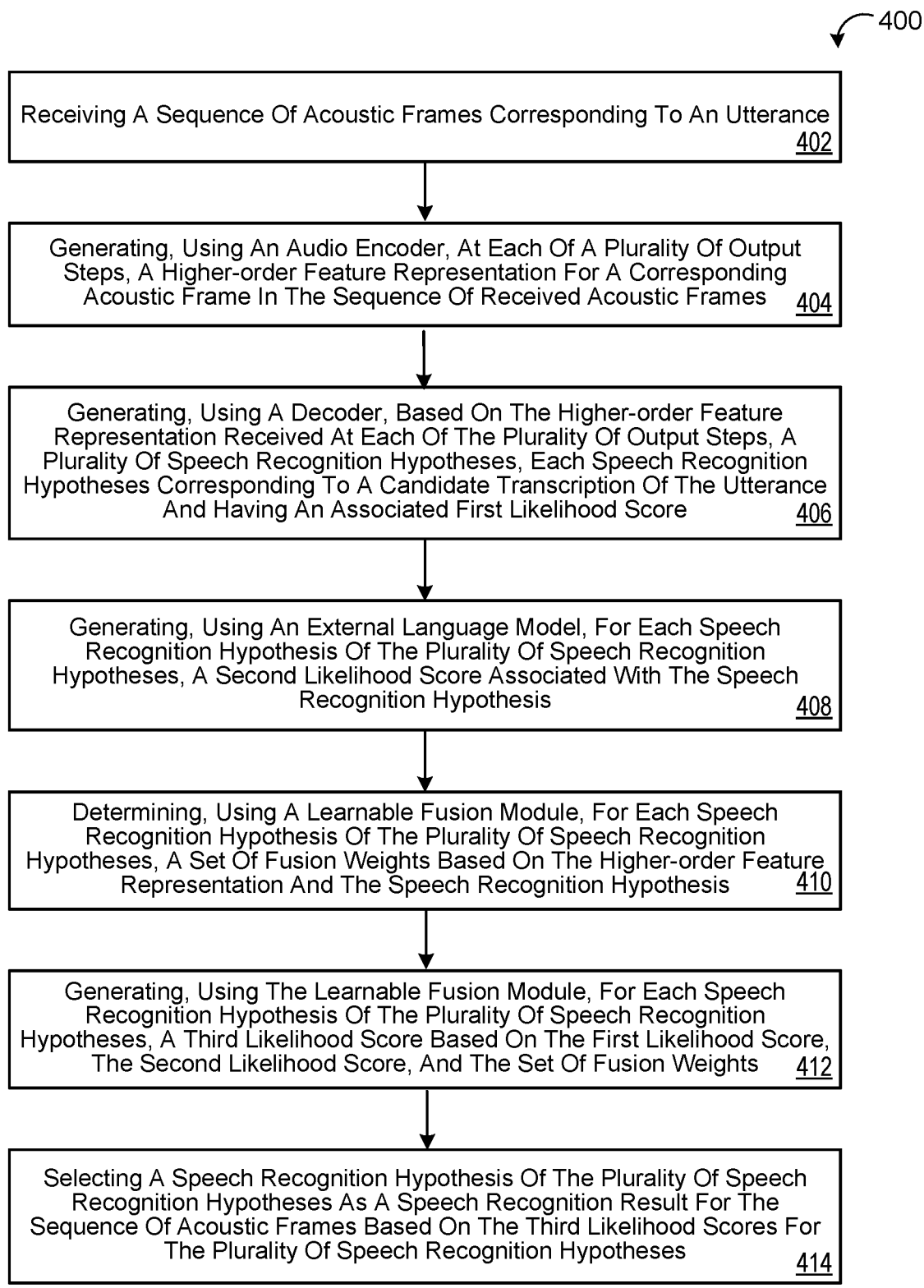
FIG. 4 is a flowchart of an example arrangement of operations for a computer-implemented method of improving rare word recognition.

FIG. 4 is a flowchart of an exemplary arrangement of operations for a computer-implemented method 400 for improving rare word recognition. At operation 402, the method 400 includes receiving a sequence of acoustic frames 110 corresponding to an utterance 106. At operation 404, the method 400 includes generating, using the audio encoder 210, at each of a plurality of output steps, a higher-order feature representation 212 for a corresponding acoustic frame 110 in a sequence of received acoustic frames 110.

The method 400, at operation 406, includes generating, using the decoder 215, based on the higher-order feature representation 212 at each of the plurality of output steps, a plurality of speech recognition hypotheses $\{Y_1, \ldots, Y_K\}$, each speech recognition hypotheses $Y_k$ corresponding to a candidate transcription of the utterance 106 and having an associated first likelihood score including the likelihood scores 222, 224.

At operation 408, the method 400 includes generating, using the external language model 230, for each speech recognition hypothesis $Y_k$ of the plurality of speech recognition hypotheses $\{Y_1, \ldots, Y_K\}$, a second likelihood score $P_{ELM}(Y_k)$ 232 associated with the speech recognition hypothesis $Y_k$.

The method 400, at operation 410, includes determining, using the LFM 240, for each speech recognition hypothesis $Y_k$ of the plurality of speech recognition hypotheses $\{Y_1, \ldots, Y_K\}$, sets of fusion weights $\lambda=\{\lambda_1, \ldots, \lambda_L\}$ and $\gamma=\{\gamma_1, \ldots, \gamma_L\}$ based on the higher-order feature representation 212 and the speech recognition hypothesis $Y_k$. At operation 412, the method 400 includes generating, using the LFM 240, for each speech recognition hypothesis $Y_k$ of the plurality of speech recognition hypotheses $\{Y_1, \ldots, Y_K\}$, a third likelihood score 242 based on the first likelihood score 222, 224, the second likelihood score 232, and the set of fusion weights $\lambda=\{\lambda_1, \ldots, \lambda_L\}$ and $\gamma=\{\gamma_1, \ldots, \gamma_L\}$.

At operation 414, the method 400 includes selecting a speech recognition hypothesis $Y_k$ of the plurality of speech recognition hypotheses $\{Y_1, \ldots, Y_K\}$ as a speech recognition result 120 for the sequence of acoustic frames 110 based on the third likelihood scores 242 for the plurality of speech recognition hypotheses $\{Y_1, \ldots, Y_K\}$.

Figure 5:
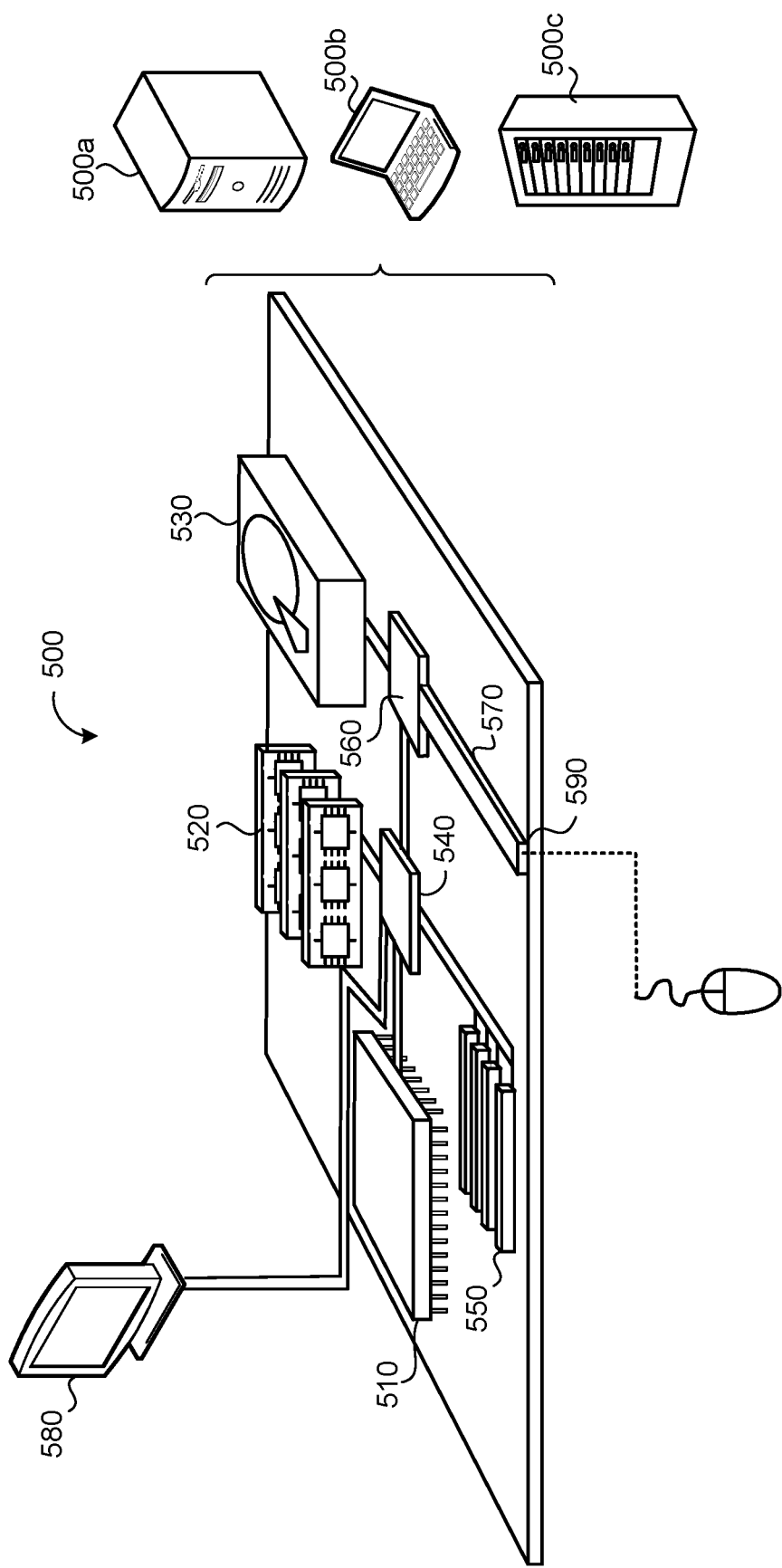
FIG. 5 is a schematic view of an example computing device that may be used to implement the systems and methods described herein.

FIG. 5 is schematic view of an example computing device 500 that may be used to implement the systems and methods described in this document. The computing device 500 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 500 includes a processor 510 (i.e., data processing hardware) that can be used to implement the data processing hardware 12 and/or 72, memory 520 (i.e., memory hardware) that can be used to implement the memory hardware 14 and/or 74, a storage device 530 (i.e., memory hardware) that can be used to implement the memory hardware 14 and/or 74, a high-speed interface/controller 540 connecting to the memory 520 and high-speed expansion ports 550, and a low speed interface/controller 560 connecting to a low speed bus 570 and a storage device 530. Each of the components 510, 520, 530, 540, 550, and 560, are interconnected using various busses, and may be mounted on a common motherboard or in other manners as appropriate. The processor 510 can process instructions for execution within the computing device 500, including instructions stored in the memory 520 or on the storage device 530 to display graphical information for a graphical user interface (GUI) on an external input/output device, such as display 580 coupled to high speed interface 540. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 520 stores information non-transitorily within the computing device 500. The memory 520 may be a computer-readable medium, a volatile memory unit(s), or non-volatile memory unit(s). The non-transitory memory 520 may be physical devices used to store programs (e.g., sequences of instructions) or data (e.g., program state information) on a temporary or permanent basis for use by the computing device 500. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 530 is capable of providing mass storage for the computing device 500. In some implementations, the storage device 530 is a computer-readable medium. In various different implementations, the storage device 530 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 520, the storage device 530, or memory on processor 510.

The high speed controller 540 manages bandwidth-intensive operations for the computing device 500, while the low speed controller 560 manages lower bandwidth-intensive operations. Such allocation of duties is exemplary only. In some implementations, the high-speed controller 540 is coupled to the memory 520, the display 580 (e.g., through a graphics processor or accelerator), and to the high-speed expansion ports 550, which may accept various expansion cards (not shown). In some implementations, the low-speed controller 560 is coupled to the storage device 530 and a low-speed expansion port 590. The low-speed expansion port 590, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 500a or multiple times in a group of such servers 500a, as a laptop computer 500b, or as part of a rack server system 500c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

These computer programs (also known as programs, software, software applications, or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Unless expressly stated to the contrary, the phrase "at least one of A, B, or C" is intended to refer to any combination or subset of A, B, C such as: (1) at least one A alone; (2) at least one B alone; (3) at least one C alone; (4) at least one A with at least one B; (5) at least one A with at least one C; (6) at least one B with at least C; and (7) at least one A with at least one B and at least one C. Moreover, unless expressly stated to the contrary, the phrase "at least one of A, B, and C" is intended to refer to any combination or subset of A, B, C such as: (1) at least one A alone; (2) at least one B alone; (3) at least one C alone; (4) at least one A with at least one B; (5) at least one A with at least one C; (6) at least one B with at least one C; and (7) at least one A with at least one B and at least one C. Furthermore, unless expressly stated to the contrary, "A or B" is intended to refer to any combination of A and B, such as: (1) A alone; (2) B alone; and (3) A and B.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method executed by data processing hardware that causes the data processing hardware to perform operations comprising:
   receiving, as input, a sequence of acoustic frames corresponding to an utterance;
   generating, using an audio encoder, at each of a plurality of output steps, a higher-order feature representation for a corresponding acoustic frame in the sequence of acoustic frames;
   generating, using a decoder, based on the higher-order feature representation at each of the plurality of output steps, a plurality of speech recognition hypotheses, each speech recognition hypotheses corresponding to a candidate transcription of the utterance and having an associated first likelihood score;
   generating, using an external language model, for each speech recognition hypothesis of the plurality of speech recognition hypotheses, a second likelihood score associated with the speech recognition hypothesis;
   determining, using a learnable fusion module, for each speech recognition hypothesis of the plurality of speech recognition hypotheses, a set of fusion weights based on the higher-order feature representation and the speech recognition hypothesis; and
   generating, using the learnable fusion module, for each speech recognition hypothesis of the plurality of speech recognition hypotheses, a third likelihood score based on the first likelihood score, the second likelihood score, and the set of fusion weights,
   wherein the audio encoder is trained using minimum additive error rate training in the presence of the external language model by adjusting likelihood scores according to minimum additive error rates among a top-k speech recognition hypotheses output from the decoder.

2. The computer-implemented method of claim 1, wherein the operations further comprise selecting a speech recognition hypothesis of the plurality of speech recognition hypotheses as a speech recognition result for the sequence of acoustic frames based on the third likelihood scores for the plurality of speech recognition hypotheses.

3. The computer-implemented method of claim 1, wherein the first likelihood score comprises a conditional likelihood score and an internal language model likelihood score.

4. The computer-implemented method of claim 1, wherein:
   the first likelihood score for a particular speech recognition hypothesis comprises a first plurality of language model scores, each language model score of the first plurality of language model scores corresponding to a particular token of the particular speech recognition hypothesis;
   the second likelihood score for the particular speech recognition hypothesis comprises a second plurality of language model scores, each language model score of the second plurality of language model scores corresponding to a particular token of the particular speech recognition hypothesis;
   the set of fusion weights for the particular speech recognition hypothesis comprises a first plurality of fusion weights and a second plurality of fusion weights, each fusion weight of the first plurality of fusion weights corresponding to a particular token of the particular speech recognition hypothesis, and each fusion weight of the second plurality of fusion weights corresponding to a particular token of the particular speech recognition hypothesis; and
   generating, using the learnable fusion module, the third likelihood score for the particular speech recognition hypothesis comprises:
      determining an internal language model score based on the first plurality of language model scores and the first plurality of fusion weights;
      determining an external language model score based on the second plurality of language model scores and the second plurality of fusion weights; and
      combining the internal language model score and the external language model score.

5. The computer-implemented method of claim 1, wherein the audio encoder, the decoder, and the learnable fusion module are jointed trained.

6. The computer-implemented method of claim 1, wherein the external language model is trained on text-only data.

7. The computer-implemented method of claim 1, wherein the external language model comprises a neural network language model comprising a stack of conformer layers or transformer layers.

8. The computer-implemented method of claim 1, wherein the external language model comprises a neural network language model comprising a stack of long short-term memory (LSTM) layers.

9. The computer-implemented method of claim 1, wherein the audio encoder comprises:
   a causal encoder comprising an initial stack of multi-head attention layers; and
   a non-causal encoder comprising a final stack of multi-head attention layers overlain on the initial stack of multi-head attention layers.

10. The computer-implemented method of claim 1, wherein the learnable fusion module is configured to compute per-token fusion weights for internal language model scores of the decoder and external language model scores of the external language model.

11. The computer-implemented method of claim 1, wherein a minimum additive error rate comprises a minimum word error rate.

12. The computer-implemented method of claim 1, wherein:
the external language model is trained on text-only data; and
the audio encoder and the decoder are trained using hybrid autoregressive transducer (HAT) factorization to facilitate integration of the external language model trained on the text-only data.

13. An automated speech recognition (ASR) system comprising:
an audio encoder configured to:
receive, as input, a sequence of acoustic frames corresponding to an utterance; and
generate, at each of a plurality of output steps, a higher-order feature representation for a corresponding acoustic frame in the sequence of acoustic frames;
a decoder configured to:
receive, as input, the higher-order feature representation generated by the audio encoder at each of the plurality of output steps; and
generate, based on the higher-order feature representation received at each of the plurality of output steps, a plurality of speech recognition hypotheses, each speech recognition hypotheses corresponding to a candidate transcription of the utterance and having an associated first likelihood score;
an external language model configured to:
receive, as input, the plurality of speech recognition hypotheses generated by the decoder; and
generate, for each speech recognition hypothesis of the plurality of speech recognition hypotheses, a second likelihood score associated with the speech recognition hypothesis; and
a learnable fusion module configured to, for each speech recognition hypothesis of the plurality of speech recognition hypotheses:
receive, as input, the higher-order feature representation generated by the audio encoder at each of the plurality of output steps;
determine a set of fusion weights based on the higher-order feature representation and the speech recognition hypothesis; and
generate a third likelihood score based on the first likelihood score, the second likelihood score, and the set of fusion weights,
wherein the audio encoder is trained using minimum additive error rate training in the presence of the external language model by adjusting likelihood scores according to minimum additive error rates among a top-k speech recognition hypotheses output from the decoder.

14. The ASR system of claim 13, wherein the operations further comprise selecting a speech recognition hypothesis of the plurality of speech recognition hypotheses as a speech recognition result for the sequence of acoustic frames based on the third likelihood scores for the plurality of speech recognition hypotheses.

15. The ASR system of claim 13, wherein the first likelihood score comprises a conditional likelihood score and an internal language model likelihood score.

16. The ASR system of claim 13, wherein:
the first likelihood score for a particular speech recognition hypothesis comprises a first plurality of language model scores, each language model score of the first plurality of language model scores corresponding to a particular token of the particular speech recognition hypothesis;
the second likelihood score for the particular speech recognition hypothesis comprises a second plurality of language model scores, each language model score of the second plurality of language model scores corresponding to a particular token of the particular speech recognition hypothesis;
the set of fusion weights for the particular speech recognition hypothesis comprises a first plurality of fusion weights and a second plurality of fusion weights, each fusion weight of the first plurality of fusion weights corresponding to a particular token of the particular speech recognition hypothesis, and each fusion weight of the second plurality of fusion weights corresponding to a particular token of the particular speech recognition hypothesis; and
the learnable fusion module is configured to generate the third likelihood score for the particular speech recognition hypothesis by:
determining an internal language model score based on the first plurality of language model scores and the first plurality of fusion weights;
determining an external language model score based on the second plurality of language model scores and the second plurality of fusion weights; and
combining the internal language model score and the external language model score.

17. The ASR system of claim 13, wherein the audio encoder, the decoder, and the learnable fusion module are jointed trained.

18. The ASR system of claim 13, wherein the external language model is trained on text-only data.

19. The ASR system of claim 13, wherein the external language model comprises a neural network language model comprising a stack of conformer layers or transformer layers.

20. The ASR system of claim 13, wherein the external language model comprises a neural network language model comprising a stack of long short-term memory (LSTM) layers.

21. The ASR system of claim 13, wherein the audio encoder comprises:
a causal encoder comprising an initial stack of multi-head attention layers; and
a non-causal encoder comprising a final stack of multi-head attention layers overlain on the initial stack of multi-head attention layers.

22. The ASR system of claim 13, wherein the learnable fusion module is configured to compute per-token fusion weights for internal language model scores of the decoder and external language model scores of the external language model.

23. The ASR system of claim 13, wherein a minimum additive error rate comprises a minimum word error rate.

24. The ASR system of claim 13, wherein:
the external language model is trained on text-only data; and
the audio encoder and the decoder are trained using hybrid autoregressive transducer (HAT) factorization to facilitate integration of the external language model trained on the text-only data.

* * * * *